United States Patent
Cominelli et al.

(10) Patent No.: US 12,429,329 B2
(45) Date of Patent: Sep. 30, 2025

(54) NON-CONTACT DIMENSIONAL MEASUREMENT DEVICE WITH MICROMETRIC RESOLUTION

(71) Applicant: TECNOSENS S.P.A., Brescia (IT)

(72) Inventors: Alessandro Cominelli, Brescia (IT); Matteo Perletti, Brescia (IT); Danilo Lentini, Brescia (IT)

(73) Assignee: TECNOSENS S.P.A., Brescia (IT)

( * ) Notice: Subject to any disclaimer, the term of this patent is extended or adjusted under 35 U.S.C. 154(b) by 368 days.

(21) Appl. No.: 17/917,655

(22) PCT Filed: Mar. 26, 2021

(86) PCT No.: PCT/IB2021/052514
§ 371 (c)(1),
(2) Date: Oct. 7, 2022

(87) PCT Pub. No.: WO2021/209845
PCT Pub. Date: Oct. 21, 2021

(65) Prior Publication Data
US 2023/0147637 A1  May 11, 2023

(30) Foreign Application Priority Data

Apr. 14, 2020  (IT) .................. 102020000007837

(51) Int. Cl.
*G01B 11/24* (2006.01)
*G01B 11/02* (2006.01)
(Continued)

(52) U.S. Cl.
CPC .............. *G01B 11/24* (2013.01); *G01B 11/02* (2013.01); *G01B 11/026* (2013.01); *G01B 11/06* (2013.01); *G01B 11/306* (2013.01); *G01N 21/958* (2013.01)

(58) Field of Classification Search
CPC ... G01C 3/00; G01C 3/02; G01C 3/06; G01C 3/08; G01N 2021/8825; G01N 2021/9511;
(Continued)

(56) References Cited

U.S. PATENT DOCUMENTS 3,807,870 A * 4/1974 Kalman ................. G01B 11/06
356/3.07
4,186,993 A * 2/1980 Shimizu ............... G02B 21/084
359/387

(Continued)

FOREIGN PATENT DOCUMENTS

DE   3507445 A1    9/1986
DE   3507445 C2 *  4/1990
(Continued)

OTHER PUBLICATIONS

International Search Report, issued in PCT/IB2021/052514, mailed Jun. 18, 2021, Rijswijk, NL.

*Primary Examiner* — Gordon J Stock, Jr.
(74) *Attorney, Agent, or Firm* — ArentFox Schiff LLP; Michael Fainberg (57) ABSTRACT

A non-contact dimensional measurement device with micrometric resolution for measuring a distance from an object provided with at least one reflective surface extends along an axis (X-X) and has a light source that produces an emitted light beam towards the object so that the at least one reflective surface produces a reflected light beam, a light barrier element positioned on an opposite side of the light source and having at least one slit allowing the reflected light beam to pass through the at least one slit only, and a detection group. The detection group has an imaging sensor on which a projection of the reflected light beam that passes through the at least one slit is detected and a processing and control assembly operatively connected to the imaging sen- (Continued)

sor and configured to analyze the projection to identify distance and characteristics of the at least one reflective surface.

14 Claims, 8 Drawing Sheets

(51) Int. Cl.
*G01B 11/06* (2006.01)
*G01B 11/30* (2006.01)
*G01N 21/958* (2006.01)

(58) Field of Classification Search
CPC ... G01N 2021/9542; G01N 2021/9544; G01N 2021/9583; G01N 2021/8812; G01N 21/95; G01N 21/9515; G01N 21/958; G01N 21/47; G02B 21/12; G02B 21/361; G02B 21/36; G02B 21/362; G02B 21/0016; G02B 21/0096; G02B 21/082; G01B 11/303; G01B 11/306; G01B 11/28; G01B 11/26; G01B 11/24; G01B 11/2408; G01B 11/22; G01B 11/14; G01B 11/08; G01B 11/06; G01B 11/0608; G01B 11/0616; G01B 11/255; G01B 11/25; G01B 11/245; G01B 11/02; G01B 11/022; G01B 11/026; G01B 11/04; G01B 11/043; G01B 11/046
See application file for complete search history.

(56) References Cited

U.S. PATENT DOCUMENTS

| | | | | |
|---|---|---|---|---|
| 4,412,746 A | * | 11/1983 | Yokouchi | G01B 11/026 250/559.38 |
| 4,767,934 A | * | 8/1988 | Stauffer | G01S 17/46 250/206 |
| 4,828,390 A | * | 5/1989 | Miyoshi | G01B 11/24 356/624 |
| 4,874,246 A | * | 10/1989 | Den Boef | G01B 11/026 356/624 |
| 4,897,536 A | * | 1/1990 | Miyoshi | G01B 11/026 250/559.31 |
| 5,978,089 A | * | 11/1999 | Horovitz | G01B 11/026 356/613 |
| 6,198,529 B1 | * | 3/2001 | Clark, Jr. | G01N 21/95684 356/394 |
| 7,880,798 B2 | * | 2/2011 | Baldwin | G02B 13/22 348/335 |
| 7,929,857 B2 | * | 4/2011 | Baldwin | G01N 21/9501 396/432 |
| 8,388,204 B2 | * | 3/2013 | Case | G01N 21/9501 362/558 |
| 8,670,031 B2 | * | 3/2014 | Case | G01N 21/8806 382/150 |
| 8,928,892 B2 | * | 1/2015 | Meimoun | G01B 11/25 356/601 |
| 9,646,372 B2 | * | 5/2017 | Srocka | G06T 7/70 |
| 10,222,199 B2 | * | 3/2019 | Takushima | G01B 11/14 |
| 10,969,569 B2 | * | 4/2021 | Lim | G01N 21/255 |
| 2007/0242279 A1 | * | 10/2007 | Michelt | G01B 11/24 356/609 |
| 2007/0263203 A1 | * | 11/2007 | Typpo | G01B 11/303 356/4.03 |
| 2007/0263228 A1 | * | 11/2007 | Typpo | G01B 11/0691 356/429 |
| 2015/0233708 A1 | * | 8/2015 | Gruhn | G01B 11/25 356/608 |
| 2019/0120962 A1 | * | 4/2019 | Gimpel | G01S 7/4808 |

FOREIGN PATENT DOCUMENTS

| | | | |
|---|---|---|---|
| EP | 0234562 A2 | 9/1987 | |
| EP | 0279347 A2 | 8/1988 | |
| EP | 1795862 A2 | 6/2007 | |
| JP | S5752805 A | 3/1982 | |
| JP | 2014122890 A | * 7/2014 | ............ G01B 11/02 |

* cited by examiner

NON-CONTACT DIMENSIONAL MEASUREMENT DEVICE WITH MICROMETRIC RESOLUTION

CROSS-REFERENCE TO RELATED APPLICATIONS

This application is a National Phase Application of PCT International Application No. PCT/IB2021/052514, having an International Filing Date of Mar. 26, 2021 which claims priority to Italian Application No. 102020000007837 filed Apr. 14, 2020.

FIELD OF THE INVENTION

The present invention relates to a non-contact dimensional measurement device having micrometric resolution. Furthermore, the present invention relates to a dimensional and/or product shape control system, which comprises at least one non-contact dimensional measurement device with micrometric resolution.

In particular, a "non-contact dimensional measurement device with micrometric resolution" means that the device is suitable for measuring the distance between its position and an object, in particular a reference plane or surface thereof, with a resolution and accuracy of the order of the micron and over a measuring range comprised between 1 millimeter and 100 millimeters.

Preferably, a similar definition of "non-contact dimensional measurement device with micrometric resolution" is also "non-contact displacement transducer device with micrometric resolution".

To further contextualize the present invention, it is worth noting that the non-contact dimensional measurement device with micrometric resolution relates to the field of the technology of dimensional control devices for precision measurements in the industrial sector.

In this context, said dimensional control devices are classified as contact devices and non-contact devices.

Both of the above categories are applied not only in the dimensional measurement of mechanical parts but also in the industry of manufacturing glass components with both flat and curved surfaces. For example, this applies to the measurement of glass and other transparent materials, even of large size, such as those used in the automotive, railway, or aeronautical sectors, in which an accurate verification of their metrological characteristics is needed both before they are placed on the market and during their manufacturing process.

BACKGROUND OF THE INVENTION

Contact devices are characterized by a movable part, which comes into contact with the surface of the object relative to which the distance or size is intended to be measured during the measurement.

A typical limitation of the contact devices is inherent in their nature, i.e., in the operating mode.

Indeed, it has been found that the contact of the movable part of the device with the surface can cause displacements and/or deformations of the object being measured, thus not guaranteeing an accurate measurement and/or giving rise to potential damage to the object itself.

The known non-contact devices are classifiable into different types, as a function of their principle of operation.

The most important non-contact devices are those of the optical type, i.e., using light as the measuring means. Such devices measure the distance from an object, e.g., by analyzing the intensity of a reflected light beam, or by using laser triangulation technology, or are confocal (monochromatic or polychromatic), or by using the principle of interferometry.

Non-contact devices solve the typical criticalities of contact devices described above; however, the non-contact devices known in themselves display a series of problems due both to the measurement method and to the nature and characteristics of the surface of the object relative to which the measurement is made.

In particular, performing non-contact optical dimensional measurements on objects with transparent or semi-transparent surfaces displays significant difficulties. For example, the laser triangulation method are not usable if the surface is transparent. For example, the detection sensors that analyze the intensity of a reflected light beam as a useful signal for measuring the distance are affected by errors due to other physical quantities, such as the ambient temperature value and the reflectance of the surface itself. For example, devices with confocal sensors or interferometers overcome some of the above problems and limitations but are extremely complex and expensive and thus of limited use for large-scale measurements in an industrial environment.

In this context of the background art, it is apparent that the need for a non-contact dimensional measurement device with micrometric resolution, which carries out non-contact measurements and overcomes the problems and limitations of known solutions, is strongly felt.

SUMMARY OF THE INVENTION

It is the object of the present invention to provide a non-contact dimensional measurement device with micrometric resolution, which is easy to use, highly accurate and reliable as well as cost-effective, to be applicable in the field of industrial measurement and advanced technology sectors.

Said purpose is achieved by a non-contact dimensional measurement device with micrometric resolution and a dimensional and/or product shape control system as described and claimed herein.

The claims dependent thereon show preferred variants implying further advantageous aspects.

BRIEF DESCRIPTION OF THE DRAWINGS

Further features and advantages of the invention will be apparent from the description provided below of preferred embodiments thereof, given by way of non-limiting examples, with reference to the accompanying drawings, in which:

FIGS. 3' and 3" show two graphs relating to the measurement diagrammatically shown in FIG. 3;

FIGS. 4' and 4" show two graphs relating to the measurement diagrammatically shown in FIG. 4;

FIGS. 5' and 5" show two graphs relating to the measurement diagrammatically shown in FIG. 5;

FIGS. 6' and 6" show two graphs relating to the measurement diagrammatically shown in FIG. 6;

DETAILED DESCRIPTION

With reference to the accompanying figures, a non-contact dimensional measurement device with micrometric resolution, according to the present invention, is indicated by reference numeral 1.

The detection device 1 of the present invention is suitable for detecting the distance to an object 900 provided with a reflective surface 950. Preferably, hereinafter in the present discussion, the words "object" or "product" are substantially used as synonyms.

Preferably, the object 900 is a body comprising at least one surface characterized by full or partial specular reflection.

Preferably, the object 900 is made of glass or other transparent or semi-transparent material.

Preferably, the object 900 is a glass pane or sheet. In the embodiment, in which the object 900 is a pane or sheet made of a transparent or semi-transparent material, e.g., glass, this comprises the reflective surface 950 on the first side and a second reflective surface 955 on the second side. Preferably, the two reflective surfaces represent the outer surfaces of a glass pane. Preferably, the first side is at a proximal position to the non-contact dimensional measurement device with micrometric resolution 1 while the second side is at a distal position from the non-contact dimensional measurement device with micrometric resolution 1.

It is a further aim of the present invention to provide a dimensional and/or product shape control system suitable for verifying the conformity and characteristics of an object 900 comprising at least one non-contact dimensional measurement device with micrometric resolution 1 according to the present invention.

According to a preferred embodiment, the dimensional and/or product shape control system comprises a support frame on which a plurality of dimensional measurement devices with micrometric resolution 1 is positioned. Preferably, said support frame is suitable for supporting dimensional measurement devices with micrometric resolution 1, each in a respective preferred and predetermined position. Preferably, said dimensional measurement devices with micrometric resolution 1 simultaneously detect characteristics of the object 900, at different points.

According to a preferred embodiment, the dimensional and/or product shape control system comprises a moving system, which mounts one or more dimensional measurement devices with micrometric resolution 1 to scan an object 900.

According to a preferred embodiment, the dimensional and/or product shape control system is specifically applied in the manufacturing industry of glass sheet-shaped products, e.g., in the production industry of glass for the automotive, railway, or aeronautical sectors.

Preferably, the dimensional and/or product shape control system is suitable for checking the characteristics of the "glass" product as a whole. Preferably, the dimensional and/or product shape control produced is suitable for checking the integrity, thickness, and possibly the curvature and/or planarity of the glass.

According to the present invention, the non-contact dimensional measurement device with micrometric resolution 1 extends along an axis X-X.

Preferably, as described at length below, the axis X-X is also the axis along which the measurement is performed.

Indicatively, the non-contact dimensional measurement device with micrometric resolution 1 measures the position of the object 900 along said axis X-X, wherein said object 900 is positioned at a distance comprised between 1 millimeter and 100 millimeters. Preferably, said object 900 is positioned at a distance comprised between 1 millimeter and 100 millimeters from the end of the non-contact dimensional measurement device with micrometric resolution 1.

According to the present invention, the non-contact dimensional measurement device with micrometric resolution 1 comprises a light source 2 which produces an emitted light beam "Le" towards the object 900.

In particular, the light source 2 produces an emitted light beam "Le" in an emission direction, preferably substantially parallel to the axis X-X. In other words, the light source 2 produces an incoherent and divergent light beam along the axis X-X.

According to a preferred embodiment, the light source 2 is positioned at the axis X-X.

According to a preferred embodiment, the light source 2 is an LED.

According to a preferred embodiment, the light source 2 is a BLUE LED.

According to a preferred embodiment, the light source 2 is a BLUE LED in the form of a bare die.

According to the present invention, the light source 2 produces an emitted light beam "Le" towards the reflective surface 950 so that the reflective surface 950 reflects a reflected light beam "Lr" along in a reflection direction substantially opposite to the emission direction.

Furthermore, according to the present invention, the non-contact dimensional measurement device with micrometric resolution 1 comprises a light barrier element 3 positioned on the opposite side of the light source 2 relative to said emission direction. In other words, said light barrier element 3 is suitable for preventing the passage of the reflected light beam "Lr".

Preferably, the light barrier element 3 is substantially flat and orthogonal relative to the axis X-X.

According to the present invention, said light barrier element 3 comprises at least one slit 30 traversable by the reflected light beam "Lr". Preferably, said slit 30 extends, in a through manner, in a direction parallel to the axis X-X.

In other words, the light barrier element 3 prevents the passage of light, i.e., it prevents the passage of the reflected light beam "Lr", except for the space of the at least one slit 30.

According to the present invention, the slit 30 is appropriately shaped.

According to a preferred embodiment, the slit 30 has a substantially circular shape. In other words, the slit 30 extends substantially by 360°. Preferably, the slit 30 is centered on the axis X-X.

Preferably, the slit 30 comprises, and is delimited by, a first slit edge 31, preferably the inner edge, and a second slit edge 32, preferably the outer edge.

According to a preferred embodiment, the slit 30 has a width comprised between the first slit edge 31 and the second slit edge 32, between 5 microns and 500 microns. Preferably, the slit 30 has a width comprised between the first slit edge 31 and the second slit edge comprised between 10 microns and 100 microns.

According to the present invention, the non-contact dimensional measurement device with micrometric resolution 1 comprises a detection group 5 suitable for detecting and analyze the light beam that passes through the slit 30.

Said detection group 5 comprises an imaging sensor 50 on which a projection 500 of the reflected light beam "Lr" that passes through the slit 30 is detected.

According to a preferred embodiment, the projection 500 has a first projection edge 501 and a second projection edge 502, as a function of the shape of the slit 30.

For example, in a preferred embodiment, with slit 30 having a substantially circular shape, the projections 500 detected on the imaging sensor 50 also have a substantially circular shape.

According to a preferred embodiment, the slit 30 is substantially circular. However, the shape of the slit 30 is not limiting relative to the present invention.

According to a preferred embodiment, said imaging sensor 50 is a CMOS sensor.

According to a preferred embodiment, the CMOS sensor has an active area comprised between $1*1$ millimeters$^2$ and $30*30$ millimeters$^2$. Preferably, the CMOS sensor has an active area comprised between $1*1$ millimeters$^2$ and $10*10$ millimeters$^2$. Preferably, the CMOS sensor has an active area comprised between $1*1$ millimeters$^2$ and $4*4$ millimeters$^2$. Preferably, the CMOS sensor has an active area of about $1.5*1.5$ millimeters$^2$.

According to a preferred embodiment, the imaging sensor 50 is positioned so that the center of the active area corresponds to the axis X-X.

Furthermore, the detection group 5 comprises a processing and control assembly 51 operatively connected to the imaging sensor 50 suitable for analyzing the shape and position of said projection 500.

Preferably, the processing and control assembly 51 by analyzing the shape and the position of the projection 500 is suitable for identifying the distance and characteristics of the reflective surface 950 of the object 900.

According to a preferred embodiment, the processing and control assembly 51 comprises a data conversion and transmission unit 51' operatively connected to the detection sensor 50 suitable for reading and convert the data generated by said detection sensor 50.

Furthermore, the processing and control assembly 51 comprises a processing and control unit 51", operatively connected to the data conversion and transmission unit 51', suitable for receiving data read by the data conversion and transmission unit 51' to analyze them and thereby verify the geometry and position of said projection 500.

According to a preferred embodiment, the non-contact dimensional measurement device with micrometric resolution 1 further comprises an optical group 4 suitable for converging the reflected light beam "Lr" that passes through the slit 30 towards the imaging sensor 50.

A diagrammatic and simulated preferred embodiment of the optical group 4 is shown in the accompanying tables. With the exception of the features described below, the optical group 4 is not limited to a specific embodiment.

According to a preferred embodiment, the optical group 4 comprises one or more lenses. Preferably, said lenses are spherical or aspherical.

According to a preferred embodiment, the number of lenses comprised in the optical group 4 is as limited as possible, preferably the optical group 4 comprises one lens with a base surface 41 and a second convex surface 42.

Preferably, the optical group 4 is designable to achieve the right compromise between required performance, effectiveness, size, and cost.

According to a preferred embodiment, the optical group 4 comprises two axially spaced spherical plane-convex lenses.

According to a preferred embodiment, the optical group 4 comprises a base surface 41 facing the object 900. Preferably, said base surface 41 is axially proximal to the object 900.

According to a preferred embodiment, said base surface 41 is planar. Preferably, the base surface 41 is orthogonal to the axis X-X.

According to a preferred embodiment, the light barrier element 3 is positioned on the base surface 41.

According to a preferred embodiment, the light source 2 and the light barrier element 3 are integrally connected.

Preferably, they are both integrally connected to the optical group 4.

According to a preferred embodiment, the light barrier element 3 is made of metal.

According to a preferred embodiment, the light barrier element 3 is made of current-conducting material. Preferably, the light barrier element 3 is suitable for electrically powering the light source 2 mounted thereon. Preferably, the light barrier element 3 is shaped to identify a positive pole and a negative pole operatively connected to the light source 2. According to a preferred embodiment, the light barrier element 3 is obtained by depositing at least one film of material that are not traversable through by light on said base surface 41.

Preferably, the light barrier element 3 comprises at least one film of electrically conductive material. Preferably, the light barrier element 3 comprises one or more films of conductive metallic material. Preferably, said operation of depositing the at least one film of material on the base surface 41 is performed by means of metallization operations.

Figure 10:
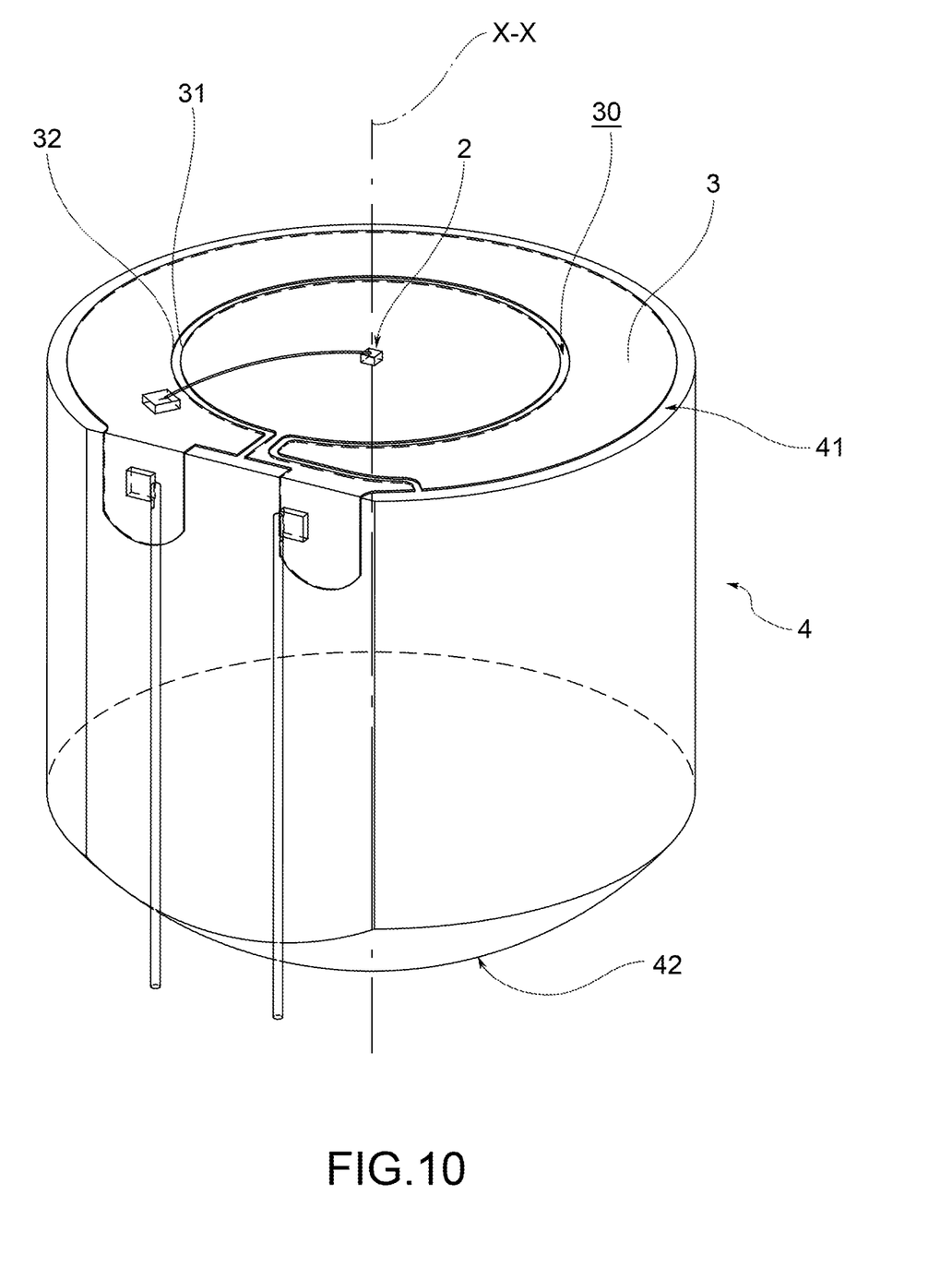
FIG. 10 illustrates an enlarged view of a preferred embodiment of some components comprised in the non-contact dimensional measurement device with micrometric resolution, in particular a light source, a light barrier element, and an optical group.

FIG. 10 shows a non-limiting example of a preferred embodiment of an optical group 4 (diagrammatically shown), a light barrier element 3 integrally resting on the base surface 41 of said optical group 4 and an LED light source 2 mounted on and electrically powered by the light barrier element 3. According to such a preferred embodiment, the slit 30 is specially shaped to divide the positive pole from the negative pole.

Furthermore, again according to said preferred embodiment, the light source 2 is operatively connected to the light barrier element 3 by means of die bonding and wire bonding techniques.

According to a preferred embodiment, the non-contact dimensional measurement device with micrometric resolution 1 is suitable for also detecting the thickness of a transparent object 900. Indeed, said transparent object 900 has on a first side, the reflective surface 950 and on the second side (or opposite side) a second reflective surface 955.

In particular, the detection group 5 detects and analyzes the projection 500 due to the reflective surface 950 and an auxiliary projection 510 due to the second reflective surface 955 on the imaging sensor 50.

Indeed, the auxiliary projection 510 preferably comprises a first auxiliary projection edge 511 and a second auxiliary projection edge 512.

In other words, when it emits an emitted light beam "Le" towards a transparent object 900 the non-contact dimensional measurement device with micrometric resolution 1 receives two reflected light beams "Lr", "Lr'": one reflected light beam "Lr" due to the first reflective surface 950 and a second reflected light beam "Lr'" due to the second reflective surface 955.

Some measurement situations are diagrammatically shown in figures from 3 to 9, represented in graphs. In particular, said figures refer to measurements related to a non-contact dimensional measurement device with micrometric resolution 1 comprising a slit 30 of substantially circular shape.

Figure 1:
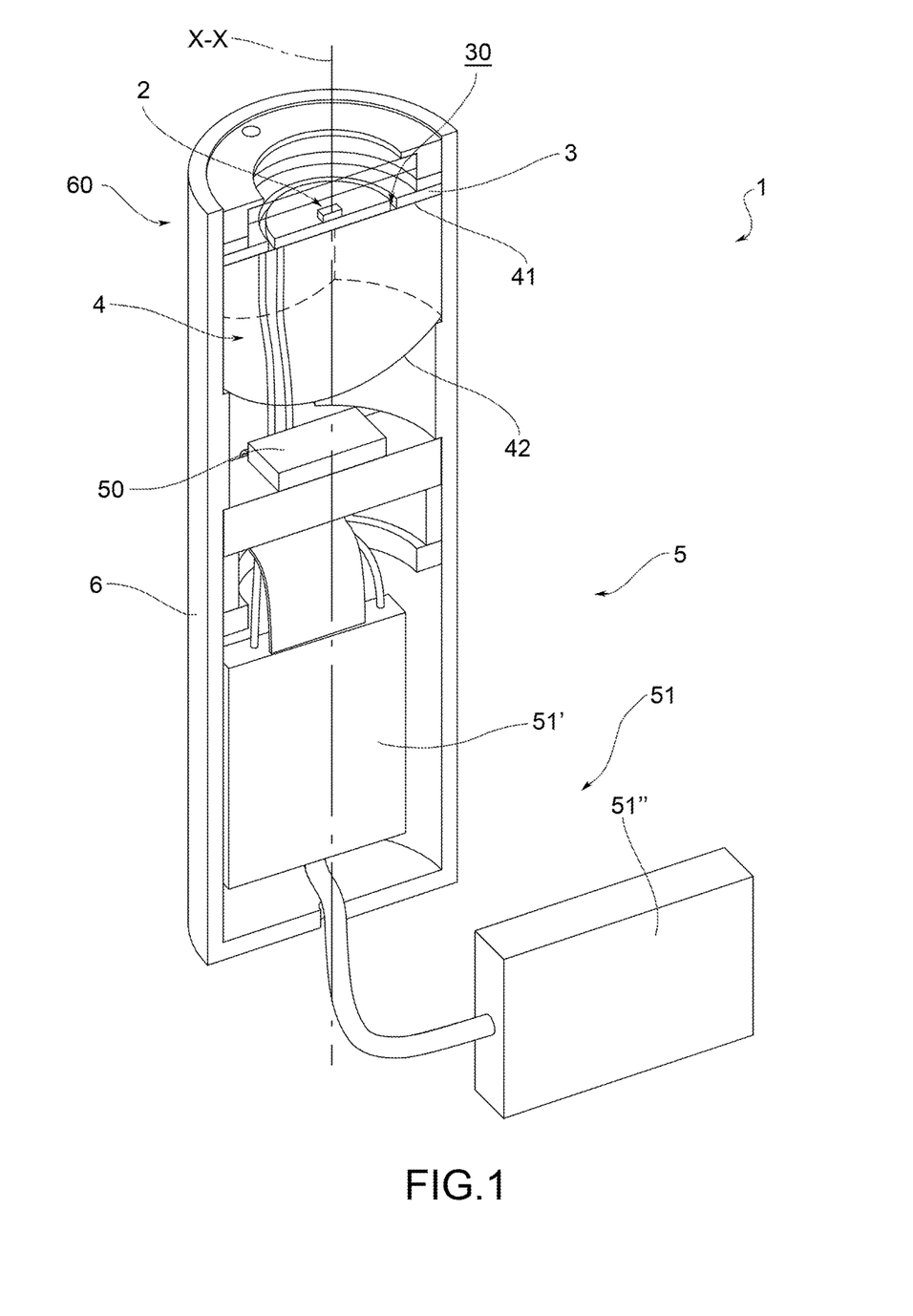
FIG. 1 diagrammatically shows a non-contact dimensional measurement device with micrometric resolution according to the present invention, in a perspective view in the axial section.
Figure 2:
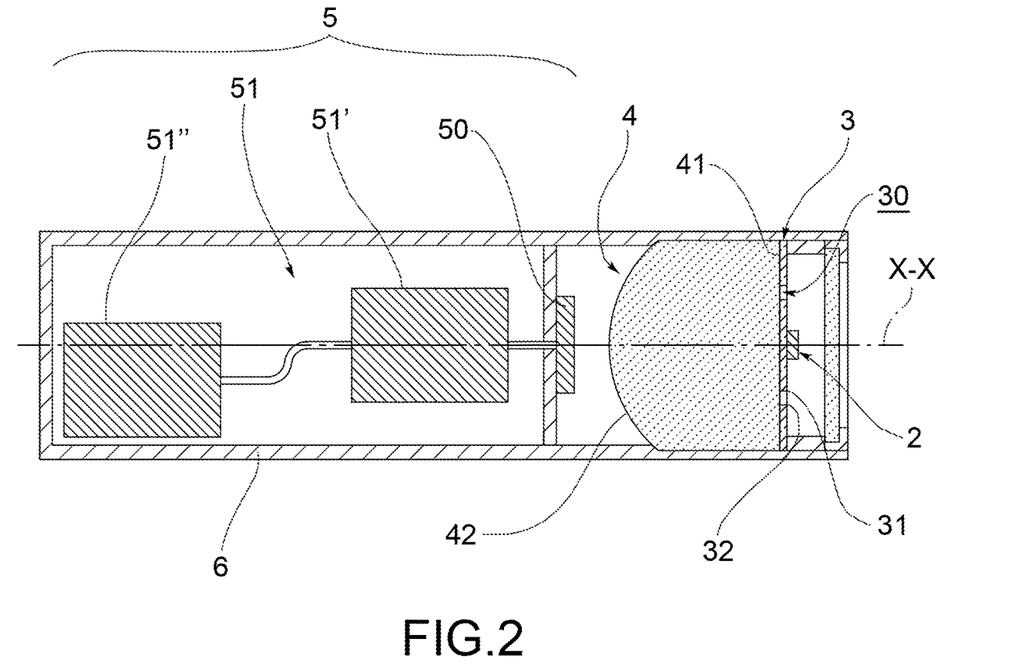
FIGS. 2 and 2a are two, respectively longitudinal and transverse diagrammatic cross-section views of a non-contact dimensional measurement device with micrometric resolution according to a preferred embodiment.
Figure 2A:
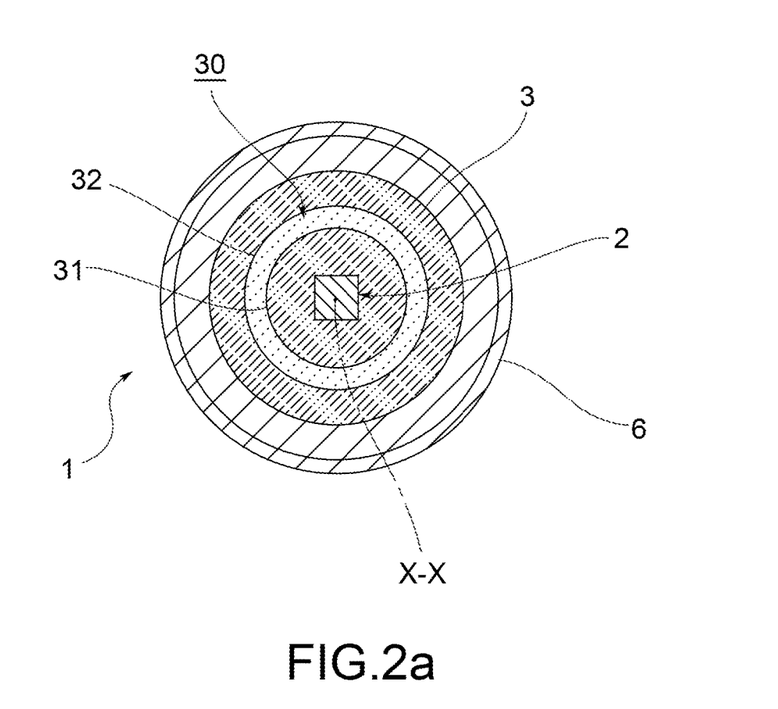
Figure 3:
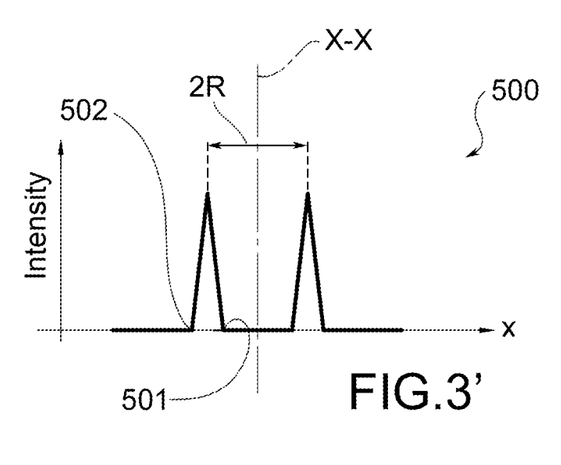
FIG. 3 diagrammatically shows a first measurement on a target characterized by specular reflection performed by means of a non-contact dimensional measurement device with micrometric resolution according to the present invention.

Specifically, FIGS. 3, 3' and 3" show a first measurement, in which the object 900, in particular its reflective surface 950, is positioned at a distance "d".

Figure 7:
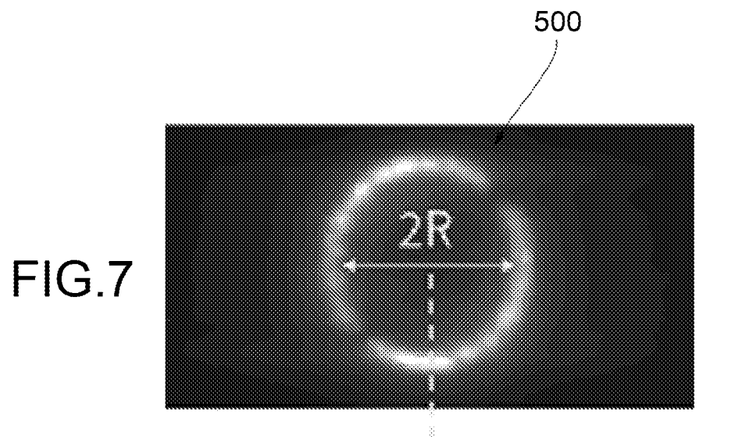
FIG. 7 shows a signal obtained using an imaging sensor comprised in a non-contact dimensional measurement device with micrometric resolution according to the present detection, as per the measurement in FIG. 4.

With reference to said first measurement situation, FIG. 7 shows an outline of the projection 500 on the imaging sensor 50. In particular, by means of the data processing and control assembly 51, which exploits a specially configured image processing algorithm, the value of the radius of the projection 500, indicated by "R", whose value is correlated to the distance "d", is identified. Thus, the desired value of distance "d" is identified by measuring the radius of the projection 500. In other words, the signals generated by the imaging sensor 50 are sent through the conversion and transmission unit to the processing and control unit, which reconstructs the geometry of the projection 500 by exploiting a suitable image processing algorithm, identifying said radius indicated by "R".

Figure 4:
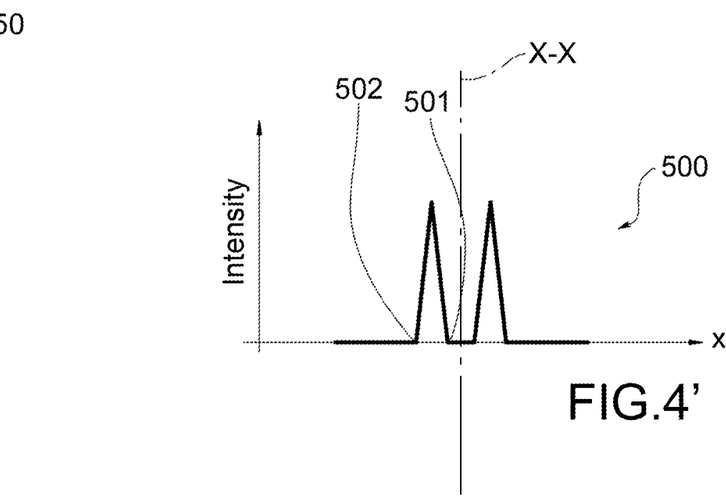
FIG. 4 diagrammatically shows a second measurement performed on a target characterized by specular reflection by means of a non-contact dimensional measurement device with micrometric resolution according to the present invention, wherein the object is positioned at a different distance relative to the diagram in FIG. 3.

FIGS. 4, 4' and 4" show a second measurement situation, in which object 900, in particular the reflective surface 950, is positioned at a distance "d'" (different from the distance "d" in the previous figures). In FIGS. 4' and 4", the differences between the first measurement situation, as shown in FIGS. 3' and 3", and the second measurement situation are indeed apparent.

Figure 5:
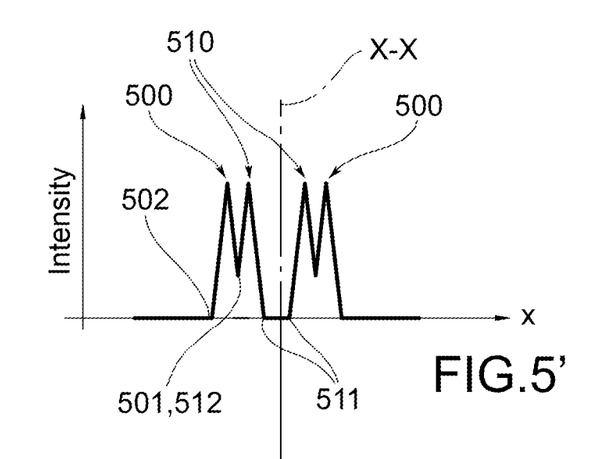
FIG. 5 diagrammatically shows a third measurement performed on a semi-transparent target by means of a non-contact dimensional measurement device having micrometric resolution according to the present invention.

FIGS. 5, 5' and 5" show a third measurement situation, in which object 900 is a transparent or semi-transparent foil with thickness "s", comprised between a first reflective surface 950 and a second reflective surface 955. The first reflective surface 950 is at a distance "d" from the non-contact dimensional measurement device with micrometric resolution 1 while the second reflective surface 955 is spaced by a thickness "s" from the first reflective surface 950.

Figure 8:
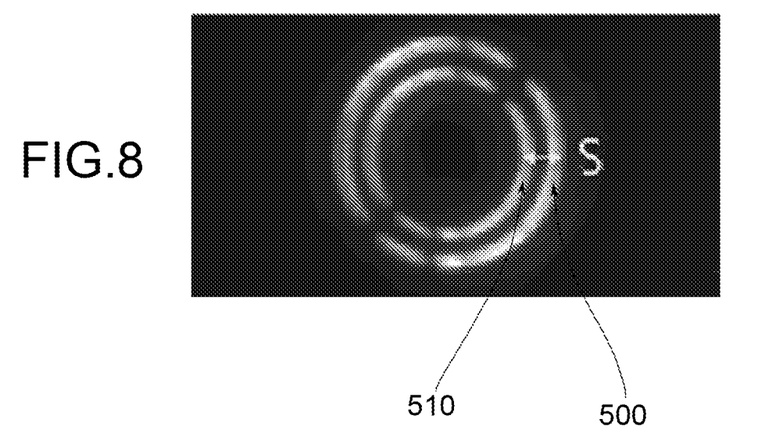
FIG. 8 shows a signal obtained using an imaging sensor comprised in a non-contact dimensional measurement device with micrometric resolution according to the present detection, as per the measurement in FIG. 5.

With reference to said third measurement situation, FIG. 8 shows an image of the projection 500 and the auxiliary projection 510 on the imaging sensor 50. In particular, by means of the data processing and control assembly 51, which exploits a specially configured image processing algorithm, the value of the distance present between the two projections, indicated with "S", is identified, whose value is correlated to the thickness "s" of the object 900 of transparent type. Thus, the desired value of thickness "s" is identified by measuring the distance between the two projections. In other words, the signals generated by the imaging sensor 50 are sent through the conversion and transmission unit to the processing and control unit, which reconstructs the geometry of the projection 500 and the auxiliary projection 510 exploiting a specially configured image processing algorithm to calculate said distance "S".

Figure 6:
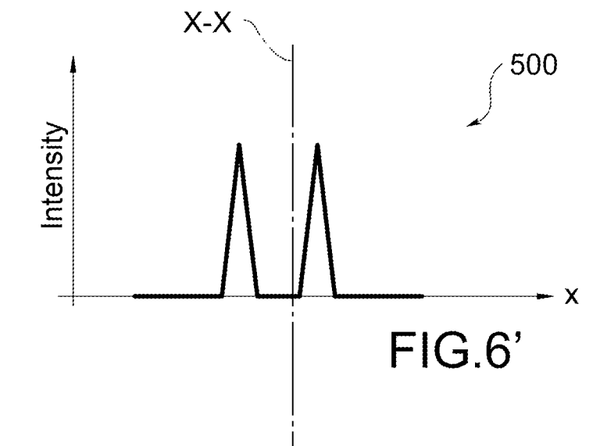
FIG. 6 diagrammatically shows a fourth measurement carried out on a target characterized by specular reflection and inclined performed by means of a non-contact dimensional measurement device with micrometric resolution according to the present invention.

Furthermore, FIGS. 6, 6' and 6" show a fourth measurement situation, in which object 900 is inclined relative to axis X-X, or has a reflective surface 950 inclined relative to axis X-X. In particular, said inclination angle is indicated by the angle "a".

Figure 9:
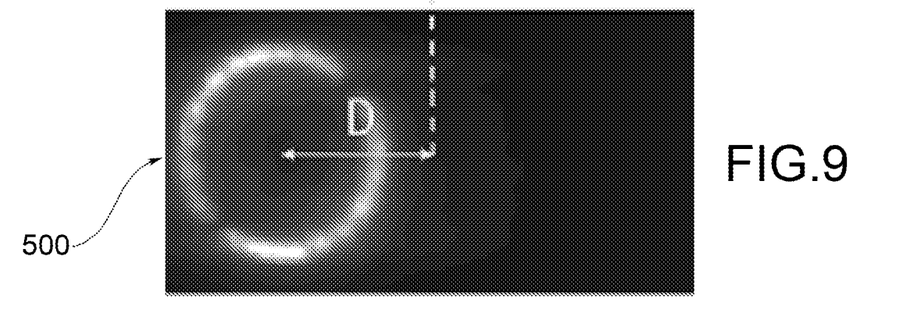
FIG. 9 shows a signal obtained using an imaging sensor comprised in a non-contact dimensional measurement device with micrometric resolution according to the present detection, as per the measurement in FIG. 6.

With reference to said fourth measurement situation, FIG. 9 shows an image of the projection 500 obtained on the imaging sensor 50. The processing and control assembly 51 calculates an offset value "D", by exploiting a specially configured image processing algorithm; the offset value "D" is the difference between the position of the center of the projection 500 obtained with object 900 inclined by an inclination angle "a" and the center of the projection 500 obtained with a null inclination angle (i.e., with "a" equal to zero). Then, the desired value of the angle "a" is found by measuring said offset "D".

According to a preferred embodiment, the non-contact dimensional measurement device with micrometric resolution 1 comprises a device body 6 extending along axis X-X.

Preferably, the device body 6 identifies a measuring end 60 through which the emission of the emitted light beam "Le" occurs and through which the reception of the reflected light beam "Lr" occurs.

According to a preferred embodiment, the device body 6 has radial dimensions comprised between 6 millimeters and 60 millimeters. Preferably, the device body 6 has radial dimensions comprised between 6 millimeters and 15 millimeters. Preferably, the device body 6 has a radial dimension of 8 millimeters.

According to a preferred embodiment, the device body 6 has an axial-symmetric shape.

Preferably, the device body 6 has a cylindrical shape.

Preferably, the device body 6 has a tapered shape in a region proximal to the measuring end 60 and widens in a region axially distal from said measuring end.

According to a preferred embodiment, all of the aforesaid components are accommodated in the device body 6.

According to a variant embodiment, all of the aforesaid components are accommodated in the device body 6, except for the processing and control unit 51" which is remotely positioned from the data conversion and transmission unit 51'. In such an embodiment, all of the above-described components suitable for performing the detection are housed in the device body 6, while the necessary analyses are performed by means of the remote processing and control unit 51" to achieve the desired measurement through specially configured image processing algorithms.

According to a preferred embodiment, the device body 50 has axial dimensions comprised between 6 millimeters and 200 millimeters. According to a preferred embodiment, the axial distance between the light barrier element 3 and the imaging sensor 50 is comprised between 5 millimeters and 100 millimeters.

Innovatively, the non-contact dimensional measurement device with micrometric resolution and the dimensional and/or product shape control system according to the present invention largely fulfill the intended purposes by solving the problems encountered in typical state-of-the-art solutions.

Advantageously, the non-contact dimensional measurement device with micrometric resolution of the present invention sets within the context of contact or non-contact detection devices of the prior art as an alternative thereto.

Advantageously, the non-contact dimensional measurement device with micrometric resolution is suitable for detecting in easy and reliable manner the distance between itself and the object.

Advantageously, the non-contact dimensional measurement device with micrometric resolution is also suitable for detecting other characteristics of the object, such as its inclination, and in particular the inclination of its reflective surface, simply and reliably.

Advantageously, the non-contact dimensional measurement device with micrometric resolution is suitable for detecting the thickness of a transparent or semi-transparent object.

Advantageously, the non-contact dimensional measurement device with micrometric resolution is suitable for having wide dissemination and broad uses in the industrial sector.

Advantageously, a large number of dimensional measurement devices with micrometric resolution, mutually positioned in predetermined positions or moved by a special moving and scanning system, are usable to verify the size and shape of an object, such as a pane of glass, albeit at low cost.

Advantageously, the non-contact dimensional measurement device with micrometric resolution has a limited number of components.

Advantageously, the non-contact dimensional measurement device with micrometric resolution has an extremely compact size. Advantageously, in a preferred embodiment, the light barrier element and the light source are integrally connected. Advantageously, in a preferred embodiment, the light barrier element and the optical group are integrally connected.

Advantageously, in a preferred embodiment, the light barrier element in addition to performing the functionality of acting as a barrier to reflected light is also suitable for electrically powering the light source.

It is apparent that a person skilled in the art may make changes to the object of the present invention, all of which contained within the scope of protection as defined in the following claims to satisfy contingent needs.

The invention claimed is:

1. A non-contact dimensional measurement device with micrometric resolution for measuring a distance from an object provided with at least one reflective surface, the non-contact dimensional measurement device with micrometric resolution extending along an axis (X-X) and comprising:
    a light source that produces an emitted light beam toward the object such that the at least one reflective surface of the object produces a reflected light beam in a reflection direction opposite to an emission direction;
    a light barrier element positioned on an opposite side of the light source with respect to the emission direction, wherein said light barrier element comprises at least one slit shaped such that the light barrier element only allows the reflected light beam to pass through said at least one slit;
    a detection group comprising:
        an imaging sensor on which a projection of the reflected light beam that passes through the at least one slit is detected; and
        a processing and control assembly operatively connected to the imaging sensor and configured to analyze shape and position of said projection to identify distance and characteristics of the at least one reflective surface of the object; and
    an optical group suitable for conveying the reflected light beam that passes through the at least one slit toward the imaging sensor, wherein the optical group comprises a base surface positioned in a position facing the object, and wherein the light barrier element is positioned on the base surface.

2. The non-contact dimensional measurement device with micrometric resolution of claim 1, wherein the light source is positioned on the light barrier element, and wherein the light barrier element is made of electrically conductive material and is suitable for electrically powering the light source.

3. The non-contact dimensional measurement device with micrometric resolution of claim 1, wherein the at least one slit comprises a first slit edge and a second slit edge, and wherein the projection has a first projection edge and a second projection edge.

4. The non-contact dimensional measurement device with micrometric resolution of claim 1, wherein the imaging sensor is a complementary metal-oxide-semiconductor (CMOS) imaging sensor.

5. The non-contact dimensional measurement device with micrometric resolution of claim 1, wherein said optical group comprises at least one spherical or non-spherical lens.

6. The non-contact dimensional measurement device with micrometric resolution of claim 1, wherein said base surface is planar.

7. The non-contact dimensional measurement device with micrometric resolution of claim 1, wherein the light barrier element is made of metal.

8. The non-contact dimensional measurement device with micrometric resolution of claim 1, wherein the object is a pane, a sheet or a product made of glass or other transparent or semi-transparent material.

9. The non-contact dimensional measurement device with micrometric resolution of claim 1, wherein the object is a transparent or semi-transparent object having the at least one reflective surface on a first side and a second reflective surface on a second side, and wherein the non-contact dimensional measurement device with micrometric resolution is suitable for detecting a thickness of the transparent or semi-transparent object by detecting, on the imaging sensor, the projection caused by the at least one reflective surface and an auxiliary projection caused by the second reflective surface.

10. The non-contact dimensional measurement device with micrometric resolution of claim 9, wherein the auxiliary projection has a first auxiliary projection edge and a second auxiliary projection edge.

11. The non-contact dimensional measurement device with micrometric resolution of claim 1, wherein the light source, the light barrier element and the imaging sensor are positioned so as to be centered on the axis (X-X), and wherein the at least one slit is shaped symmetrically with respect to the axis (X-X).

12. The non-contact dimensional measurement device with micrometric resolution of claim 11, wherein the at least one slit is circular having a center on the axis (X-X) and projections detected on the imaging sensor are circular, and wherein position and shape of the projections are dependent on axial and angular positioning of the at least one reflective surface of the object.

13. The non-contact dimensional measurement device with micrometric resolution of claim 1, further comprising a device body that extends along the axis (X-X), identifying a measurement end through which the emitted light beam is emitted and the reflected light beam is received.

14. The non-contact dimensional measurement device with micrometric resolution of claim 13, wherein the device body has radial dimensions ranging between 6 millimeters and 60 millimeters.

\* \* \* \* \*